Oct. 29, 1963 M. E. SIEGAL 3,109,148

OSCILLATOR FREQUENCY CONTROL SYSTEM

Filed April 23, 1959

INVENTOR.
MARVYN E. SIEGAL
BY
Nelson E. Kimmelman
ATTORNEY

United States Patent Office 3,109,148

Patented Oct. 29, 1963

3,109,148

OSCILLATOR FREQUENCY CONTROL SYSTEM

Marvyn E. Siegal, Haddonfield, N.J., assignor, by mesne assignments, to Philco Corporation, Philadelphia, Pa., a corporation of Delaware Filed Apr. 23, 1959, Ser. No. 808,390
3 Claims. (Cl. 331—14)

Figure 2:
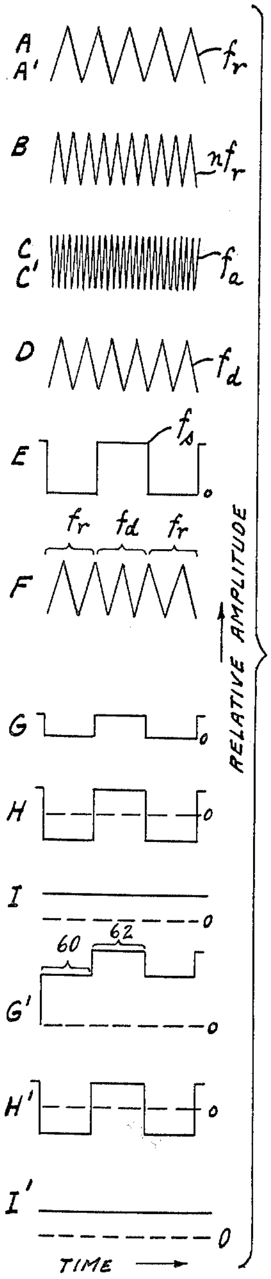

This invention relates to frequency control systems and especially to frequency control systems which employ frequency discriminating circuits.

It is often desirable in communication systems, navigation systems, and measuring systems to provide an oscillatory wave whose frequency stability is not subject to substantial changes. For example, in the FM telemetering art the output wave of an FM transmitter having "center" or nominal frequency is deviated to correspond to the data to be sent. To avoid transmission of erroneous information it is important that the center frequency of the transmitter be maintained constant. In the UHF art, the prior art taught that the output signal of a magnetron, for example, could be mixed with a reference frequency wave consisting of the output signal of a crystal oscillator which has been multiplied in frequency. The mixer produced a difference frequency signal which was applied to a frequency discriminator which theoretically had a "cross-over frequency" (i.e., the frequency at which it produced zero output signal), which was the same as that of the difference frequency when the magnetron was operating at its center frequency. The discriminator would produce a D.C. error signal for stabilizing the oscillator, whose polarity and amplitude were a function of the deviation, if any, of the difference frequency signal from its frequency when the magnetron was operating at its center frequency and indicated the sense and the magnitude of any deviation of the magnetron frequency therefrom.

In practice, however, the actual cross-over frequency of a discriminator in operation is subject to change because of changes in the parameters of its circuit components. Hence the characteristic "S-curve" of the discriminator may shift either to the left or right of the origin so that, in the prior art system, a zero output signal was produced by the discriminator at a frequency other than the desired frequency. Furthermore, due to the shift, an erroneous D.C. component was introduced in the output signal of the discriminator, not only when the frequency of the input signal was the same as the nominal cross-over frequency, but also at other input signal frequencies. Consequently, the discriminator would produce an error signal which itself inaccurately represented the deviation of the magnetron output signal from the desired center frequency so would not tend to restore the magnetron to the desired center frequency. In short the precision of these prior systems was no better than the precision of the discriminator.

Another disadvantage of the prior art system was that since the output of a discriminator is essentially D.C., D.C. amplifiers with their attendant problems of drift, would ordinarily be used, introducing even more error into the control system.

It is therefore an object of the present invention to provide an oscillator frequency control system whose accuracy and efficiency is substantially unaffected by changing parameters of some of the frequency-sensitive circuits connected therewith.

Another object of the invention is to provide a novel system which employs a discriminator for controlling the frequency of an oscillator, wherein changes in the cross-over frequency of the discriminator do not appreciably impair the accurate operation of the system.

Still another object of the invention is to provide a frequency control system employing a discriminator but permitting A.C. amplification of the control signal produced thereby.

It is a further object of the invention to provide a frequency control system for holding precisely the frequency of a UHF oscillator, such as a magnetron, to a harmonic of a crystal-controlled oscillator substantially independently of variations in the parameters of the frequency control system.

According to my invention a reference signal having a frequency which is a subharmonic of the controlled oscillator's center frequency is multiplied and mixed with the output signal of the controlled oscillator to produce a difference signal having substantially the same frequency as the frequency of the reference frequency signal. Portions of the reference frequency signal and the difference frequency signal are then alternately supplied at an audio rate, via a switching circuit responsive to an audio switching frequency signal, to a conventional discriminator. The discriminator produces an output signal that contains an A.C. component which is applied, together with the switching signal, to a synchronous detector which produces a D.C. error signal whose polarity indicates the sense of any deviation in the frequency of the controlled oscillator's actual output and whose amplitude indicates the magnitude thereof. This error signal may then be employed to reduce the frequency deviation (from the center frequency) of the signal produced by the controlled oscillator.

Figure 1:
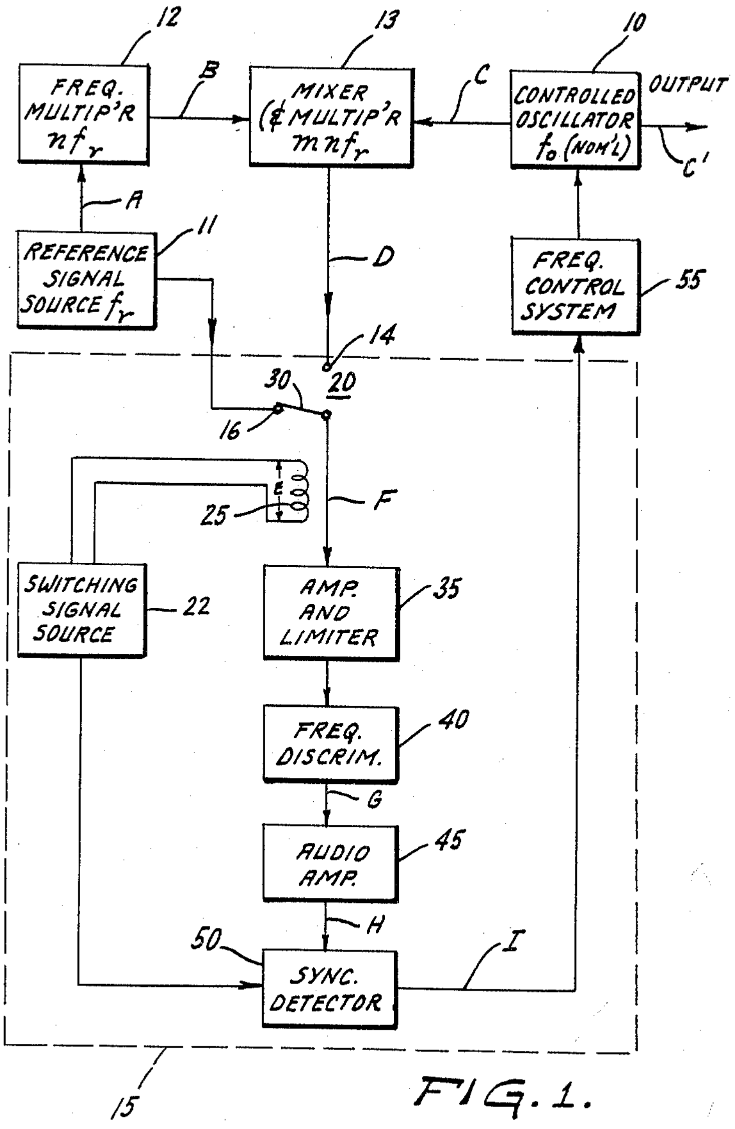

Referring to FIGURE 1 an oscillator 10 is shown which is intended to be controlled so that the frequency $f_a$ of its actual output signal at C remains substantially at a predetermined center frequency $f_0$. Waveforms at the lettered points on FIG. 1 are shown designated by the same letters in the various parts of FIG. 2. The present invention will be explained in connection with a system in which the oscillator 10 is a UHF oscillator such as a magnetron or klystron although it is equally applicable to many other types of oscillators. The oscillator 10 may comprise, for example, a voltage-tunable magnetron such as the GE Z–5225 having an external cavity, or a planar triode such as the 2C39. The voltage-tunable magnetron was originally designed as a wide-band oscillator having a high frequency-deviation sensibility which may be on the order of 1 megacycle per volt. In cases where the magnetron is to be used for FM telemetering purposes, for example, it is desired to control it so that its actual frequency $f_a$ deviates as little as possible from its center frequency $f_0$ to prevent false telemetering information from being transmitted.

A reference frequency signal, $f_r$, is provided by source 11 which may be, for example, a 2N502 transistor or a SB–100 transistor used in a conventional transistorized oscillator circuit such as is shown in FIG. 1–227 on page 346 of "Handbook of Piezo-Electric Crystals for Radio Equipment Designers" (October 1956) published as WADC Technical Report 56–156 and also known as ASTIA Document No. AD110448. The reference frequency signal $f_r$ at A is applied to a frequency multiplier 12 which may consist of a conventional class C amplifier having a tuned output circuit tuned to a harmonic of the input signal. Thus, for example, if $f_r$ is 78 mc. and the multiplier 12 multiplies it by a factor ($n$) of 8, the output signal $nf_r$ at B will be a 624 mc. signal. The signal $nf_r$ is then applied to one input of a conventional non-linear mixer 13 which may be a 1N263 crystal diode, for example, which generates harmonics of the input signals thereto. If a wave at 2496 mc., which is the fourth harmonic of $nf_m$, i.e., $mnf_r$ where $m=4$, is selected by a tuned circuit and mixed with the actual signal $f_a$ at C, the output of the mixer 13 will include a filterable signal having the difference frequency $f_d (f_d = mnf_r - f_a)$.

Thus, if $f_a$ is 2574 mc. the difference frequency signal $f_d$ will be 78 mc., the frequency of $f_r$. When the frequency of the actual signal $f_a$ equals the center frequency $f_0$, $f_d$ at D equals $f_r$, but when $f_a$ deviates from the center frequency $f_0$, the difference signal $f_d$ will not be the same as $f_r$. It should be appreciated, however, that all of the frequency multiplication may be performed in the multiplier 12 rather than part therein and part in the mixer 13.

In accordance with my invention, shown in the dashed-line box 15, the reference frequency signal $f_r$ is applied to the contact 16 of a switch indicated generally and schematically at 20. The arm 30 of the switch normally is in contact with contact 14. The difference signal $f_d$ produced by the mixer 13 is applied to the contact 14. A source 22 of a switching signal having a frequency $f_s$ (where $f_s$ is in the audio range and substantially below the lowest frequency, if any, at which the output of C' of the oscillator 10 is to be modulated) is applied across E to the winding 25 of the switch 20 causing the arm 30 to make contact with contact 16 whenever the signal at E exceeds a certain level. In one embodiment of the invention a switching signal of 60 c.p.s. was employed. In actual practice the switch 20 may comprise a conventional electronic switching circuit having two gate tubes or transistors whose output circuit is common. To one of the tubes $f_r$ and audio gating pulses at $f_s$ (at zero phase) from source 22 are applied. To the other tube, $f_d$ and gating pulses $f_s$ 180° out of phase with the first set of pulses are applied. The gating pulses themselves may be derived from rectified and clipped sine waves produced by conventional circuits, or may originate from pulse-producing circuits such as multivibrators.

As a result of the action of switch 20 the reference frequency signal $f_r$ and the difference frequency signal $f_d$ are alternately applied as a composite wave to the input (see F) of the amplifier and limiter 35 where any amplitude variations therein are removed prior to application thereof to a conventional discriminator 40.

The discriminator 40, which may be a Foster-Seeley type or a slope detector, is constructed so that its cross-over frequency is nominally the same as that of the reference signal $f_r$. It will first be assumed that the actual cross-over frequency of the discriminator remains at the frequency $f_r$, i.e., 78 mc. When the composite signal, as amplified and limited, is applied to the discriminator 40 the latter will produce an output signal at G consisting of a train of rectangular pulses whose amplitude will be a function of the magnitude of the difference in the frequencies of $f_r$ and $f_d$ applied thereto, which of course will depend on the extent of the deviation of the signal $f_a$ at C from $f_0$. The polarity of the signal at G will depend on the sense of the deviation, i.e., whether $f_d$ is higher or lower than $f_r$ (depending whether $f_a$ is higher or lower than $f_0$).

The A.C. discriminator output signal at G is then coupled to a conventional audio amplifier 45 which is constructed to have a bandwidth sufficient to pass, preferably, up to the tenth harmonic of the signal $f_s$ so that no phase shift at the switching frequency is introduced. As there is capacitive coupling in the amplifier 45 its output signal at H will consist of an A.C. component (which does not any longer indicate, in itself, the sense of the deviation) which is then applied, by transformer coupling, for example, to a conventional synchronous detector 50 to which the switching signal $f_s$ from source 22 is also applied.

The synchronous detector 50 may be of the type shown in FIGURE 5.8–2 on page 181 of volume II of "Servomechanisms and Regulating System Design" (Wiley, 1955) by Chestnut and Mayer. The synchronous detector 50 produces an error signal at I consisting essentially of a D.C. signal whose polarity indicates the direction of the deviation of the controlled oscillator's output signal and whose amplitude indicates the extent of the deviation. This signal is applied to a conventional frequency control system indicated schematically in block 55. The system 55 may consist of a reactance tube or the like in cases where the oscillator 10 is not so constructed as to be capable of being deviated by an error signal applied directly thereto. In the case of voltage-tunable magnetrons, however, the frequency control system 55 may, as is quite conventional, be part of the UHF generator 10 itself, e.g., an electrode whose potential, changed by the application of the error signal thereto, produces frequency changes in the oscillator.

In the foregoing it has been assumed that there is no change or shift in the cross-over frequency of the discriminator 40, and it has been seen that the accuracy of the overall control system of FIG. 1 is limited essentially only by the tolerances of the frequency stability of the reference oscillator 11. However, it is an important feature of my invention that even if the cross-over frequency of the discriminator 40 shifts, no frequency error is introduced thereby. That this is so may be appreciated from the following explanation.

It will be assumed that the cross-over frequency of the discriminator does shift to the left, i.e., it produces zero output not at $f_r$ but at some lower frequency. Consequently, the output wave of the discriminator 40 will be as shown in G' of FIG. 2. As seen in G', the reference frequency component $f_r$ of the composite wave (see F) applied to the discriminator will now cause, not a zero output signal therefrom (as shown in waveform G in the previous case), but a positive pulse 60, whereas the signal $f_d$ will cause the production of positive pulse 62 since both input signals will fall effectively at higher points on the S-curve of the discriminator. However, if the S-curve is linear the difference in the peaks of pulses 60 and 62 (i.e., the A.C. component) will be the same as was shown in G; the reason for the differences in G and G' arise solely from the addition of a D.C. component due to the drift of the cross-over frequency. When the wave G' is amplified in audio amplifier 45, only the A.C. component will be amplified to produce the wave H', which is identical to H, and hence the output wave I' of the synchronous detector 50 in this case will be the same as in the case where no cross-over drift occurred.

In the event that the cross-over frequency shift is to the right, the bursts of the composite wave which correspond to $f_r$ will cause a negative-going pulse to be produced by the discriminator whereas the burst of $f_d$ will cause a negative pulse but of smaller amplitude. However, after passage through the amplifier 45, only the A.C. component will remain and the synchronous detector 50 will convert this into a D.C. wave having the correct polarity and magnitude to reduce the deviation of the oscillator by the proper amount, notwithstanding the drift of the cross-over frequency.

I claim:

1. A system for controlling the frequency of an oscillator intended to produce an output signal at a frequency $f$, said frequency $f$ having a predetermined nominal value $f_0$, said system comprising a reference signal source providing at a first output a reference signal at frequency $f_r$ and at a second output a reference signal at frequency $af_r$, where $f_r=f_0/n$, $a$ and $n$ are both integers, and $a$ has a value less than $n$, heterodyne mixer means coupled to said oscillator and said second output of said reference signal source and responsive to said reference signal at frequency $af_r$ and the output signal of said oscillator for providing a first heterodyne signal at frequency $$\frac{f-af_r}{b}$$

where $b$ is an integer having a value such that $$\frac{n-a}{b}=1$$

frequency discriminating means, switch means coupled to said first output of said reference signal source, the output of said heterodyne mixer means and the input of said frequency discriminating means, a control signal source coupled to said switch means for providing an alternating control signal to said switch means, said switch means being responsive to said alternating control signal to connect, alternately at the frequency of said control signal, said first output of said reference signal source and the output of said heterodyne mixer means to the input of said frequency discriminating means, synchronous detector means, audio amplifier means coupling the output of said frequency discriminating means to one input of said synchronous detector means, said audio amplifier means passing only the alternating current components of the signal at the output of said frequency discriminating means, means coupling the output of said control signal source to a second input of said synchronous detector means, and frequency control means coupled to said oscillator and responsive to the output of said synchronous detector means for controlling the frequency of the output signal of said oscillator.

2. A frequency controlling system as in claim 1 wherein $a=(n-1)$ and $b=1$.

3. A system for controlling the frequency of a first oscillator intended to produce an output signal at frequency $f$, said frequency $f$ having a predetermined nominal value $f_0$, said system comprising a reference oscillator for providing a reference signal having a stable frequency $f_r$, where $f_r=f_0/n$, $n$ being an integer greater than 2, frequency multiplier means coupled to the output of said reference oscillator, said frequency multiplier means being adapted to provide an output signal at a frequency $mf_r$, where $m=(n-1)$, heterodyne mixer means coupled to the outputs of said frequency multiplier means and said first oscillator, said heterodyne mixer means being constructed and arranged to provide an output signal having a frequency equal to $f-mf_r$, frequency discriminating means, switch means coupled to said reference oscillator, said heterodyne mixer means and said frequency discriminating means, a control signal source coupled to said switch means for providing an alternating control signal, said switch means being responsive to said alternating control signal to connect, alternately at the frequency of said control signal, the output of said reference oscillator and the output of said heterodyne mixer means to the input of said frequency discriminating means, synchronous detector means, audio amplifier means coupling the output of said frequency discriminator means to one input of said synchronous detector means, said audio amplifier means passing only the alternating current components of the signal at the output of said frequency discriminating means, means coupling said control signal source to a second input of said synchronous detector means, and frequency control means coupled to said first oscillator and responsive to the output of said synchronous detector means for controlling the frequency of said first oscillator in accordance with the signal supplied by said synchronous detector means.

References Cited in the file of this patent

UNITED STATES PATENTS

| | | |
|---|---|---|
| 2,424,833 | Korman | July 29, 1947 |
| 2,640,155 | Rambo | May 26, 1953 |
| 2,838,673 | Fernsler et al. | June 10, 1958 |